March 24, 1942. M. NEBEL 2,277,249
PRODUCTION OF SINGLE TOPS FOR STOCKINGS
Filed Aug. 12, 1938  5 Sheets-Sheet 1

Inventor:
Max Nebel

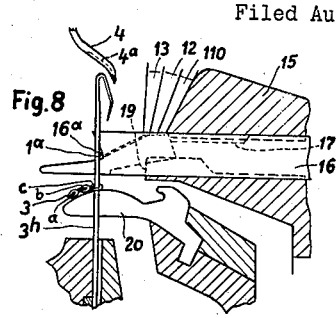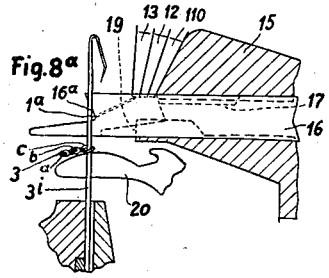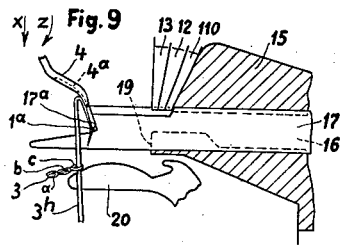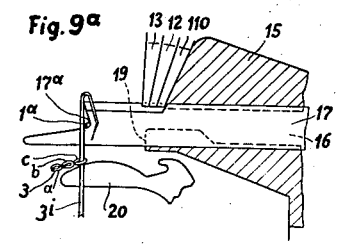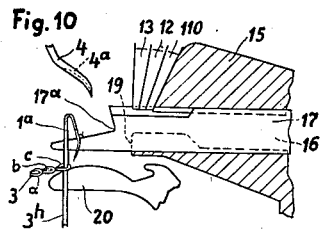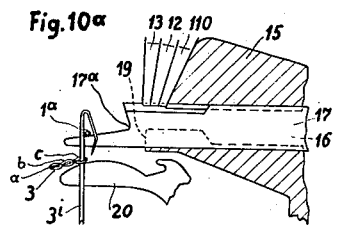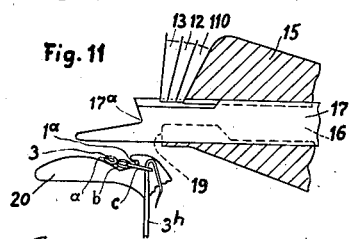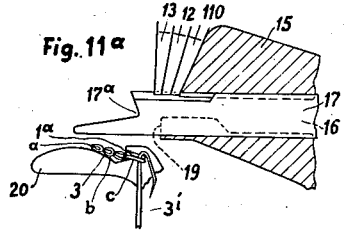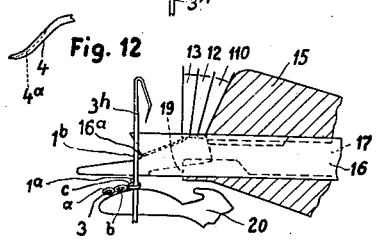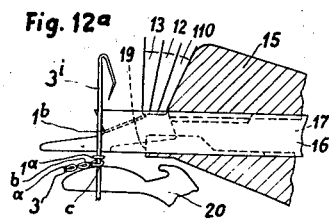

March 24, 1942.  M. NEBEL  2,277,249
PRODUCTION OF SINGLE TOPS FOR STOCKINGS
Filed Aug. 12, 1938     5 Sheets-Sheet 3
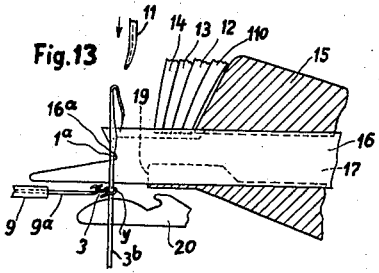
Fig. 13
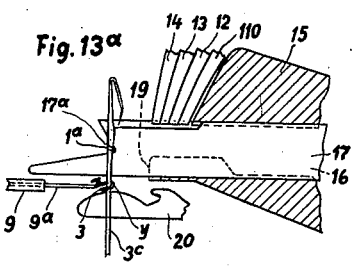
Fig. 13ᵃ
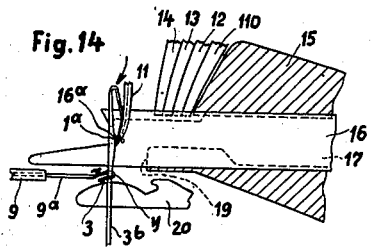
Fig. 14
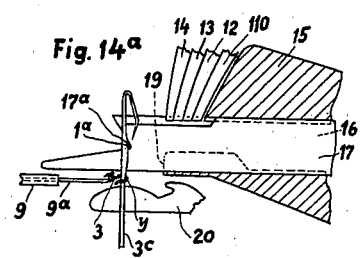
Fig. 14ᵃ
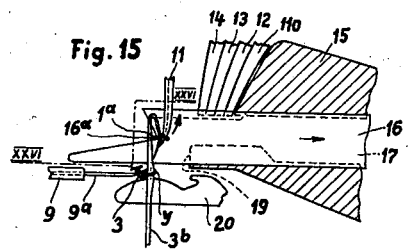
Fig. 15
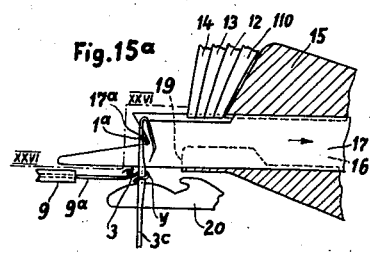
Fig. 15ᵃ
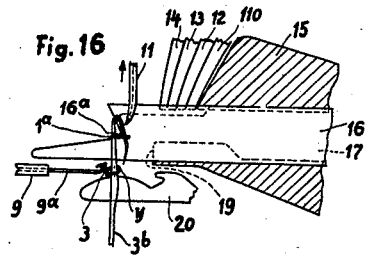
Fig. 16
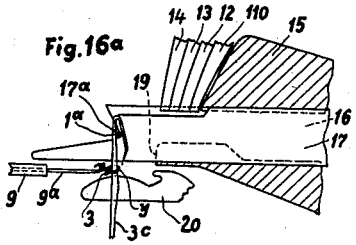
Fig. 16ᵃ
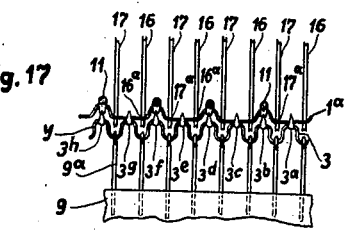
Fig. 17
Inventor:
Max Nebel Patented Mar. 24, 1942

2,277,249

UNITED STATES PATENT OFFICE 2,277,249

PRODUCTION OF SINGLE TOPS FOR STOCKINGS

Max Nebel, Chemnitz, Germany

Application August 12, 1938, Serial No. 224,548
In Germany December 4, 1937

4 Claims. (Cl. 66—83)

This invention relates to a method and device for producing single tops for stockings on a flat knitting frame, and particularly tops the initial course of which is protected against ravelling by worked in rubber weft threads.

A top of this type is described in detail in my co-pending application Serial Number 224,547, filed August 12, 1938. For clearness sake the essential novel features of a top according to this co-pending application will be briefly described again below.

The solution of the problem with which the invention covered by my co-pending application is concerned proceeds from the consideration that knitted fabric has the tendency to curl or roll up at the top toward the front side of the goods. This is due to the manner of connecting the loops with those of the preceding course. Each loop is so to speak linked to the preceding loop, and this articulation produces the tendency to fold or collapse toward the right side of the goods. To prevent curling of the outer meshes of the top and at the same time to strengthen one or more initial courses the links thereof must be stiffened as it were and the meshes supported against tilting toward the right side. According to the co-pending application, this supporting of the meshes combined with reinforcing them can be effected in a very simple manner by tying two or more rubber wefts into all sinker loops of the initial course, only two threads and not more being passed through every sinker loop so as to cross each other and alternately cover the needle meshes on the front and rear side of the fabric.

In further accordance with the invention according to the co-pending application the initial meshes are supported still more by a plurality of rubber threads worked not only into the initial course but into a few courses, preferably in such manner that in some initial courses each course contains several rubber threads in constantly decreasing number. The number of these courses may be determined by suitability as well as by the finishing possibilities desired.

The initial courses and the individual meshes may be supported against collapsing not only by working in rubber wefts but also by strengthening some meshes by hanging over meshes or not pressing some needles or providing for open work patterns in places.

Supporting of the meshes by open work patterns is preferably effected in the course or courses following the initial course.

The first course as open work course or one or more open work courses following the initial course are covered or provided with tuck stitches in such manner that every other loop has an open work or perforation pattern. To permit special finishing and patterning of the top besides supporting some meshes the perforation patterns in the following courses may be spaced at will and changed from course to course.

It is further possible to distribute rubber wefts over the entire top. I am aware that this has been proposed before, but according to the invention two or more wefts instead of only one weft may be provided in any course and looped as in the initial course or so that each weft is looped into every other needle mesh or in every third, fourth, fifth or following mesh without any crossing of only two wefts in one sinker loop.

The wefts worked in outside the initial course do not extend up to the selvage to prevent unnecessary reinforcement of the border loops which have to be sewn.

The wefts within the top may be provided also in courses containing covered meshes or tuck stitches, or wefts may be worker into one course and covered meshes in the following one. When wefts are to be worked into courses with tuck pattern, the weft is looped only into the tuck stitches.

In courses in which covered meshes and tuck stitches are provided the weft is preferably looped only into the tuck stitches.

The present invention has to do with a special method of working rubber weft threads into a top of the kind briefly characterized above and fully described in my said co-pending application, above identified.

The object of the invention is to use the known covering or presser needles of a flat kntting frame, or both kinds of needles, also for working in rubber threads without essentially altering the machine.

Rubber wefts are worked in in such manner that during two or more weft laying operations the weft is placed in one needle group under the hook and in the other group not under the hook, while the needle groups change from weft course to weft course, whereupon the loops and weft portions hanging on the needles remain thereon until the first course is formed again.

The means employed for producing a stocking according to the invention are known and found in a flat knitting frame which is particularly suited for making such tops. It has been proposed already to work in rubber wefts by means of covering needles and closing or presser needles, and it is further known to provide tuck patterns and covering patterns in one and the same course.

However, if rubber wefts are to be worked in with tuck patterns, it is necessary to throw off the weft over the needles which during working of the next course do not press off and do not receive a tuck stitch whilst the weft remains under the hook of those needles that form loops in the next course and press off, so that the weft is looped into the tuck stitch.

A top worked in the manner indicated does not show a tendency to curl or roll up, because the individual meshes of the initial course and other courses, owing to the presence of rubber wefts or perforation patterns or both, are supported and strengthened. A top of this kind is extraordinarily extensible while its elasticity is retained by the worked in rubber threads.

By way of example, the invention is illustrated in the accompanying drawings, in which Figs. 1 to 7 show different thread arrangements of some courses that are still on the needles;

Figs. 8 to 12 show different working positions during weft lapping with press needles, seen from the side;

Figs. 8a to 12a show the corresponding operating positions of the looping tools with respect to the needles on which no press needles act;

Figs. 13 to 16 show different working positions of the looping tools, seen from the side, during weft lapping by means of covering needles;

Figs. 13a to 16a show the same working positions as Figs. 13 to 16 with respect to the frame needles on which no covering needles act during weft laying;

Fig. 17 is a top view of the working position shown in Figs. 15 and 15a along the line XXVI—XXVI, of Figs. 15 and 15a;

Figure 1:
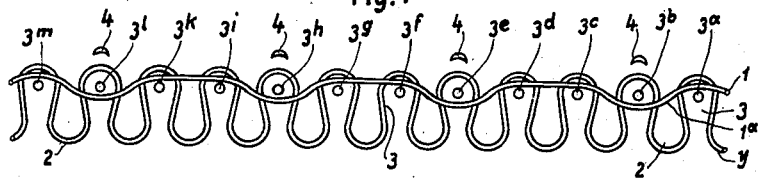
Figure 2:
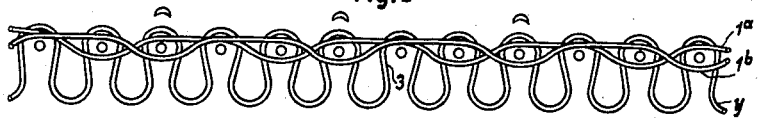
Figure 3:
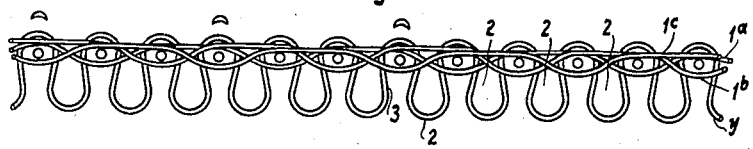

Figs. 1 to 7 show the position of the thread of different courses on the needles $3a$—$3m$ and the position of the presser needles 4. Figs. 1 to 3 show particularly the position of the threads during three successive operations when three weft threads $1a$, $1b$ and $1c$ are worked, the weft laying being such that the weft is thrown off only over one needle whilst with respect to ($x$—1) needles the weft is brought under the hook, $x$ representing the number of wefts in a course. When this method is applied (Figs. 1 to 3), the non-looped floating portion of the weft thread is therefore positioned on the rear side of the meshes whilst according to another method already mentioned the non-looped weft portion is located on the front side of the fabric. When therefore $x$ wefts (in the example shown $x=3$) are to be worked in, the auxiliary needles 4 are so arranged that ($x$—1)=2 needles are without auxiliary needles while always one frame needle between two frame needles is subjected to the action of auxiliary needles.

As indicated in Figs. 1 to 7, the auxiliary needles may be presser needles 4 or, as shown in the other figures, covering needles 11, or both kinds of needles may serve together. In the following description reference is had to auxiliary needles 4 in general.

Figure 4:
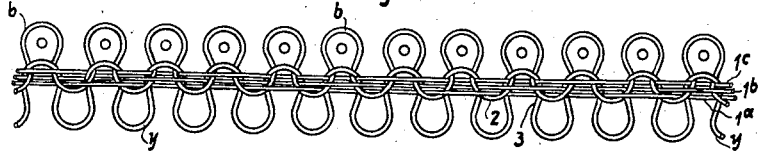

In the first course, Fig. 1, after formation of the course $y$ with the sinker loops 2 on the needles $3a$—$3m$ each frame needle $3b$, $3e$, and $3l$ is associated with an auxiliary needle 4. The weft 1 of the weft course $1a$ is therefore placed on the back of these needles and looped with respect to the other needles. During the second operation, Fig. 2, the weft course $1b$ is laid. The auxiliary needle bar with the auxiliary needles 4 is racked towards the side, i. e., to the right in the drawings, so that the first needle of the original ($x$—1) group is subjected to the action of the auxiliary needles. The original ($x$—1) group comprises the needles $3c$ and $3d$, $3f$ and $3g$, $3i$ and $3k$, and so forth. The first needle of the ($x$—1) group is therefore always the needle $3a$, $3d$, $3g$, $3k$. In the following operation (Fig. 3) which lays the weft course $1c$ the auxiliary needles are laterally racked again and associated with the second needle of the ($x$—1) group comprising the needles $3c$, $3f$, $3i$, $3m$. Fig. 2 clearly shows that only two wefts cross each other in every sinker loop 2. Fig. 4 shows the formation of the next textile course $b$, the fully worked out textile course $y$, and the looping of the three wefts.

Figure 5:
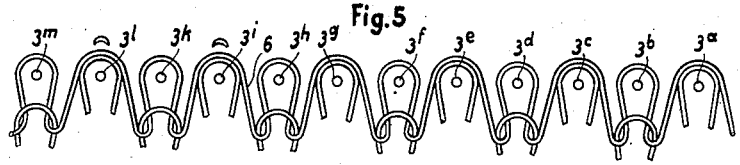
Figure 6:
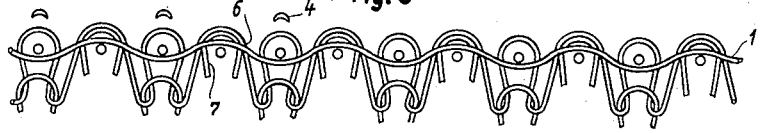
Figure 7:
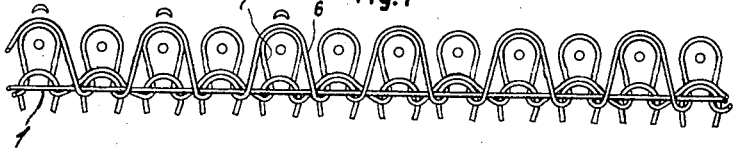

Figs. 5 and 6 represent the perforation pattern course of Fig. 7 in the form of two operations.

When after the first course, which is always secured by worked in rubber threads while the courses following the first course may or may not be provided with rubber threads, perforation patterns are used to support the mesh joints, the arrangement is preferably such that a perforation pattern is provided in every second mesh within the needle row.

This example further shows that rubber threads may be worked into the tuck pattern, the rubber thread being looped merely by the tuck stitch 6 in the long needle mesh 7 which has not been pressed in one course and forms the perforation. How this is done is shown in Figs. 5, 6, 7 respectively which indicate that after the formation of a 1:1 non-pressed course (Fig. 5) the weft 1 is always thrown off over the needles $3b$, $3d$, $3f$ and so forth (Fig. 6) which do not press during working of the next course (Fig. 7) and receive a tuck stitch 6. During the operation by which the weft 1 is laid (Fig. 6) and during the subsequent operation when another course is formed and the tuck stitches 6 are not pressed (Fig. 7) the auxiliary needles 4 are therefore always associated with the needles $3b$, $3d$, $3f$, etc.

If the weft 1 is to be looped in a tuck pattern course in the sinker loop 2 in the usual manner, it is laid and worked in the regular course following the tuck pattern course.

When laying the wefts $1a$, $1b$, etc., the procedure is therefore such that the weft is not brought under the hook of certain needles of the needle row $3a$—$3m$, for instance of every second or third needle, before being knocked over whilst with respect to the other needles it moves under the needle hook, so that all needles are moved downwardly and that meshes or wefts hanging on the needles are brought again under the hooks and thus are not knocked over with the wefts positioned under the hooks. After completion of a single-, double- or triple-threaded weft course either another weft is laid or working is continued in the usual manner, i. e., a regular course of stitches is formed, so that during the formation of this course which may constitute also a covering or tuck pattern course the weft portions positioned on the hook side are pressed with the meshes and knocked over.

All portions of the weft, without being sunk into loops, must be positively guided and held during their motion so as to insure rectilinear or slightly undulating weft laying along the needle row at any machine speed, independently of thread fluctuations, thread quality, and other factors influencing thread motion.

In further accordance with the invention this can be attained by moving the frame needles when in regular sinking position in the direction of the sinkers only to such an extent that the throats of the preceding jack sinkers and of the following dividing sinkers are positioned at the needle stems and the weft placed in the throats of the jack sinkers is kept between the throats of these sinkers and the needle stems, is not brought under the hook of every other, third, etc. needle and then knocked over.

To prevent it from being brought under the needle hook the rubber weft thread is kept away from the hooks of the needles from which it is to be knocked over during the descent.

As stated before, the hook and weft are kept away from one another by means of the auxiliary needles 4 which may be presser needles or covering needles 11.

A further feature of the invention is a flat knitting frame adapted for the production of the top described by applying the method mentioned.

The mode of operation of the presser points or spring needles 4 for this purpose will be described below.

The machine operates in such manner that the frame needles in their regular sinking position move toward the sinkers so that the throats of the preceding sinkers are positioned at the needle stems and the rubber weft placed in the throats of the jack and dividing sinkers is held between the throats of these sinkers and the needle stems, whereupon it is not placed under the hook of every other, third or following needle and then knocked over, since these needles are pressed back during their descent by needles associated with them.

The essential part of this feature of the invention is that the bending of the frame needles for the purpose of placing the weft on the back is effected while the needles carry out their downward motion. It is known to lay wefts while the needles are in lowermost position, i. e., with their heads located below the weft laid. Laying of the thread in front or in the rear of the needles is then carried out so that some needles are bent out of the plane of their row and during ascent of the needles the weft is placed in front of one needle and then behind another one.

According to this known method, the weft is, however, perfectly free and unsecured during part of the tying or looping operation.

Figs. 8 to 11 and 8a to 11a show the most important working positions of the loop-forming parts of a flat knitting frame. 110, 12, and 13 are the thread guides; 15, the sinker heads; 16, the jack sinkers; and 17, the dividing sinkers. The frame needles are designated 3a—3m as in the other figures.

It is assumed that the weft course 1a is being worked. The previously worked fabric portion with the last course is still on the needles. It is further assumed that the machine is cut between the needles 3h and 3i, so that in Figs. 8 to 11 the needle 3h and in Figs. 8a to 11a the next needle 3i are visible.

Above the frame needles the narrowing mechanism is provided with the known spring needle bar with the spring needles 4 of which only the ends are shown, as all other portions thereof as well as the manner of securing the needles in the bar and the arrangement of the latter on the narrowing mechanism are known. It is further known that the narrowing mechanism with the needle bar is lowered during the descent of the frame needles and can be oscillated to force these needles away from the presser bar. It is also known laterally to rack this needle bar to the extent of one or more needle spaces from one sinking operation to another. In carrying out the method according to the invention these conventionalities of motion of the presser points are utilized.

The general arrangement of these tools in a flat knitting frame is shown in Fig. 17 which is explained at the end of the specification.

Figs. 8 and 8a show the sinking position. The jack sinkers 16 have moved forward for sinking whilst the dividing sinkers 17 are still in initial position. As the weft 1a is not to be sunk, all frame needles 3a—3m move in the direction of the jack sinkers 16 only to such an extent that during the sinking motion of the latter the weft 1a is not sunk but merely held rectilinearly or in a slightly undulating manner between the sinking point of the throat 16a and the stem of the needles 3a—3x, as indicated in Figs. 8 and 8a. Above the frame needle 3h (Fig. 8) the presser needle 4 is disposed.

Figs. 9 and 9a show the dividing position. The frame needles 3a—3m have already descended after the dividing sinkers 17 have advanced without dividing and, as indicated in Fig. 9, hold the weft between the needle stem and the dividing point of the throat 17a. At the needle 3h (Fig. 9) those weft portions are to be formed that will lie unlooped above the needle mesh of the preceding textile course c which is still on the frame needles. For this purpose, by lowering and oscillating the needles 4 in the direction $x$ or $z$ (Fig. 9), the needles 3h whose heads are in the grooves 4a of the needles 4 are bent back until the weft portion disposed in the sinker throat passes not under but on the needle hook. This bending back of the frame needles is carried out so that the hook is not closed. Fig. 9a shows one of the needles (needle 3i) which forms the looped parts of the weft 1a and on which no presser needle acts, so that the weft portion will be placed under the hook of the needle 3h, and so forth.

The next position is shown in Figs. 10 and 10a, Fig. 10 showing the portion of the weft thread 1a lying on the needle hook and Fig. 10a, the portion thereof placed under the hook. The needles are not brought to the presser bar 19, so that the preceding course c of the goods, which is still on the needles, is not pressed off. This eccentric has the shape of the regular presser eccentric but lacks the presser curve so that the needles are actuated without presser motion.

Figs. 11 and 11a which show the transition from knocking over to inclosing position indicate that owing to alternatively laying the weft 1a before and behind the needles the weft course 1a is partly inclosed also. On some needles (e. g. 3i) the weft 1a will then be positioned on the hook side below the hook (Fig. 12a) together with the meshes 3 of the preceding course c whilst with respect to the other needles (e. g. 3h) the weft portions concerned float on the back side of the needle (Fig. 12). Figs. 12 and 12a show the initial position (corresponding to Figs. 8 and 8a) of the next operation during which, after the textile course and the laying of the weft 1a, the weft 1b is laid.

After working the weft 1a the second weft course 1b and then the ordinary course d are formed. During working of the course d the portions of the weft threads 1a and 1b positioned under the needle hook are pressed off with the old meshes 3 and knocked over, so that these portions of the wefts 1a and 1b are tied by the new course into the mesh heads of the old course. During the knitting of this course or during the narrowing operation the presser needles 4 are moved into the position shown in Figs. 12 and 12a. From this position the needles 4 move again into operating position when the loop-forming tools pass into looping position.

Instead of the presser needles 4 covering needles 11 may be used as stated for throwing the weft over the needle hook.

The particular suitability of the known narrowing mechanisms for flat knitting frames is due to the fact that the covering needles 11 in their generally used form take over the function of the above-mentioned auxiliary needles. These covering needles are of the type found in the narrowing bar of almost any machine for producing special patterns. Even when covering needles are employed according to the invention, the needles are not brought to the presser bar by employing the known odd course attachment of a striping device and thereby laterally racking the presser roll and removing it from the presser eccentric, so that the preceding course c still hanging on the needles is not pressed off. If rubber threads without a textile course are on the needles, the rubber threads are not pressed off.

These covering needles 11 in their known unchanged form are to serve also for working in wefts by effecting the positioning of the wefts on the back of certain needles. Whether and how often these operations of weft laying are successively repeated depends on how many wefts are to be placed in one course. When the course containing the weft is to be knitted, the ordinary presser bar 19 of a special auxiliary presser bar may be employed for pressing off the meshes hanging on the needles.

In this flat knitting frame for knitting the above-mentioned top according to the method described the frame needles behind which the wefts are to be placed are each associated with a covering needle which before the weft portion concerned passes under the needle hook engages with its point the groove of the frame needle in such manner that this weft portion cannot get under the hook but slides on the back of the covering needle. During further descent of the frame needle the covering needle is drawn out upwardly between frame needle and weft, and the loops hanging on the needles are not pressed off during the following ordinary pressing step.

Figs. 13 to 16, 13a to 16a, and Fig. 17 show the looping parts of the machine in their most essential operating positions.

Fig. 17 is a top view of the tool position seen from the side in Figs. 15 and 15a. The mode of operation is as follows:

After the sinking operation all loop-forming tools are in the position shown in Fig. 13. These tools are the thread guides 110, 12, 13, and 14, the sinker head 15 with the jack sinkers 16 and the dividing sinkers 17, the frame needles 3a—3m, and the knocking over bits 20. All these tools are well known parts of a flat knitting frame.

The frame needles 3a—3m (Figs. 13 and 13a) are just going down into landing position. In Fig. 13 the frame needles 3b are visible and in Fig. 13a the frame needles 3c. The needles are moved away from the presser bar, so that the weft 1a is not sunk but tightly inclosed between the needle stem, the throat 16a of the jack sinker and the throat 17a of the dividing sinker. The frame needle 3b is one of the selected frame needles which are each associated with a covering needle 11.

After the dividing operation (Figs. 14 and 14a) the covering needle 11 (Fig. 19) has also moved down to engage with its point the groove of the frame needle shortly before the point of the needle hook would be on a level with the weft 1a which is thus not placed under the needle hook but slides on the back of the needle 11.

During further descent of the frame needles 3a—3m (Figs. 15 and 15a), when the return of the sinkers occurs, the covering needle 11 (Fig. 15) moves away again from the frame needles 3a—3m in upward direction, so that the weft 1a slides over the needle hook and is thrown off. Since the frame needles, according to the invention, do not carry out a pressing motion, i. e., in a Cotton machine no movement in horizontal direction, the needle hook remains open during further descent, so that, as shown in Figs. 16 and 16a, the loops of the course y still hanging on the needle stem from the first looping operation pass again under the needle hook. During this time the covering needle moves up into initial position. The meshes hanging on the needles may also be the meshes 3 of an ordinary course worked into the top before the laying of the wefts. After the laying of the wefts the course a is formed.

Figs. 13a to 16a show how the weft is placed under the needle hook where no covering needle 11 is provided. These weft portions are thrown off only during the knitting of the following course.

Figs. 13–17 and 13a–16a show also the hanging-in comb 9 which is hung with its small hooks 9a in the initial course a.

Fig. 17 clearly shows the thread arrangement at the position of the tools shown in Fig. 15 and indicates also the auxiliary course y with the needle meshes 3 which are held by the hook 9a of the comb 9.

Such pressing needles 4 and covering needles 11 are known in flat knitting frames. Both devices can be jointly built in, and there is nothing new in the joint arrangement of these two kinds of needles for covering and pressing. A novel feature resides, however, in their separate or joint employment for the special purpose of working in rubber weft threads. By the different association of covering needles and presser needles with different frame needles it becomes possible to arrange the wefts in different manner during working of the top, beginning with the initial course. This has been explained during the description of the top.

When two or more wefts are to be placed in one course, the necessary change from one needle to the other during the laying operations is made by lateral racking of the pressing or covering needle bar. This is no novel feature, so that it will not be necessary to describe the machine construction required therefor.

Furthermore, as described above, these covering and pressing needles, 11, 4 can be used for the tuck or other patterns which serve for supporting the meshes. The needles can be used also for working in other known patterns, so that the range of application of these means forming part of a flat knitting frame is extraordinarily widened by the invention.

Figure 18:
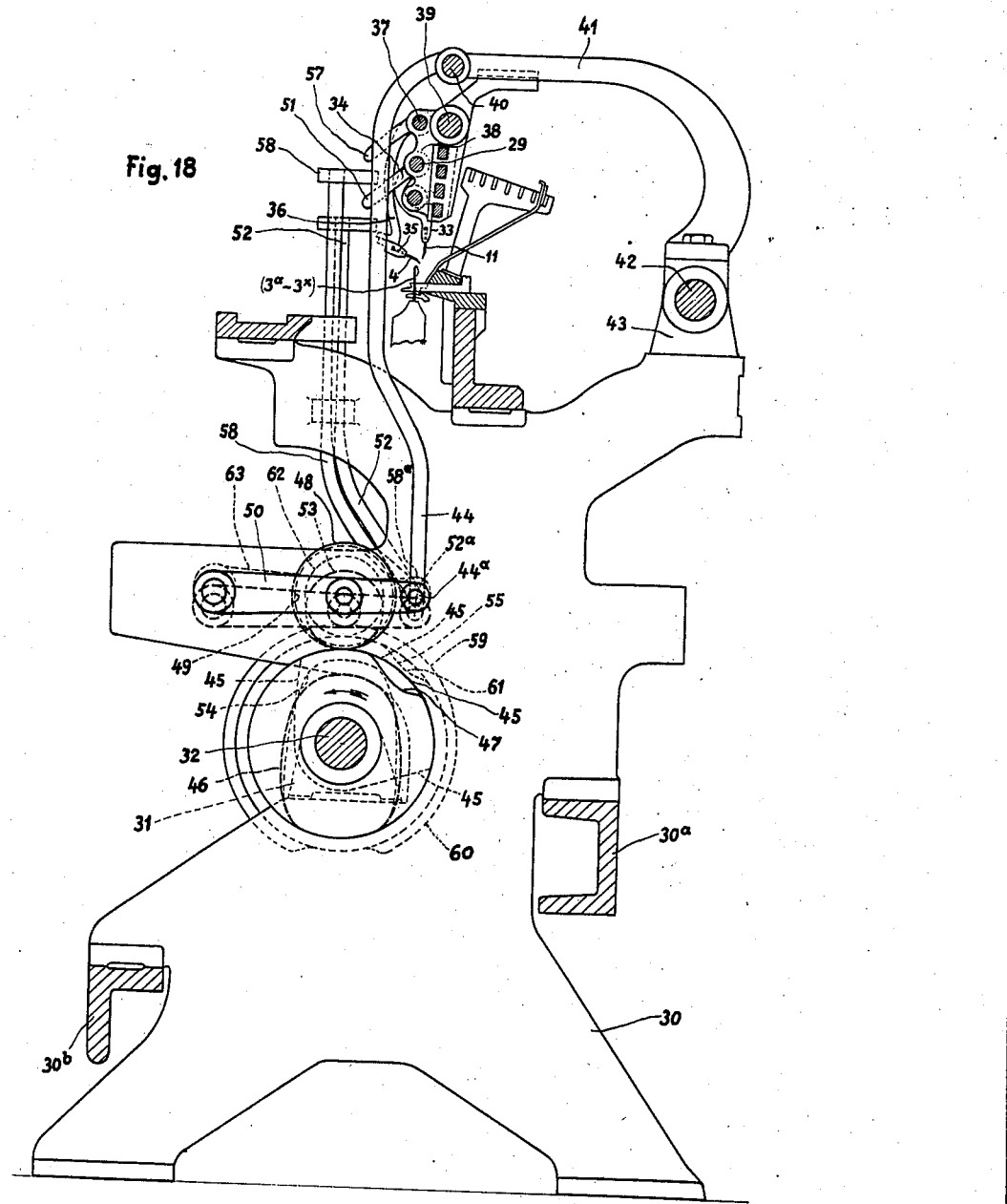
Fig. 18 is a longitudinal section through a flat knitting frame showing the looping tools and the means required for applying the method according to the invention.

To make the operation of the covering needles 11 and of the pressing needles 4 during production of a top according to the invention better understood Fig. 18 shows a cross section of a flat knitting frame of the Cotton type. Only the most important parts are represented of course which are required to understand the cooperation of covering needles, pressing needles, and frame needles.

In the drawing, a frame wall 30 is connected with the other frame walls of the machine by the cross bars 30a and 30b. The wall 30 supports also the bearing 31 for the eccentric shaft 32 on which the eccentrics are mounted which actuate the various machine parts. The drawings show only those eccentrics that serve for actuating the pressing needles 4 and covering needles 11. The machine part carrying the covering needles 11 and the pressing needles 4 is usually called a narrowing mechanism.

This narrowing mechanism comprises the covering needle bar 33 which is held by the arms 34 to the shaft 29. The pressing needles 4 are kept on the bar 35 which is supported by arms 36 on a shaft 37. The two shafts 29 and 37 carrying the covering and pressing needle bars are disposed in holders 38 which are secured to the shaft 39 supported by the arm 41. The arm 41 is secured at one end to the shaft 42 in the bearing 43 which is supported by the machine frame.

Up and down motion of the entire narrowing device supported by the arm 41 is effected by means of the linkage 44 connected at one end to shaft 40 on one end of the arm 41, and by means of the eccentrics 45, 46, 47 which act upon one of the rolls 48. The rolls 48 and 49 are disposed on a lever 50 which is positioned in the machine wall and articulated at 44a to the linkage 44. The covering needle bar is oscillated by means of a lever 51 secured to the shaft 29 and the rod 52 on which the eccentrics 54 or 55 act by means of the roll 53.

The pressing needle bar is oscillated against the lever 57, secured to the bar 35, by means of the rod 58 on which one of the eccentrics 59, 60, and 61 acts through the medium of the roll 62 secured to the lever 63 which at 58a is articulated to the rod 58.

Figs. 19 to 22 show the various relative positions of the rolls and eccentrics, which are necessary to insure operation of the narrowing device according to the invention or the normal operation thereof for narrowing and patterning or the elimination of the narrowing device from working in wefts.

Figure 19:
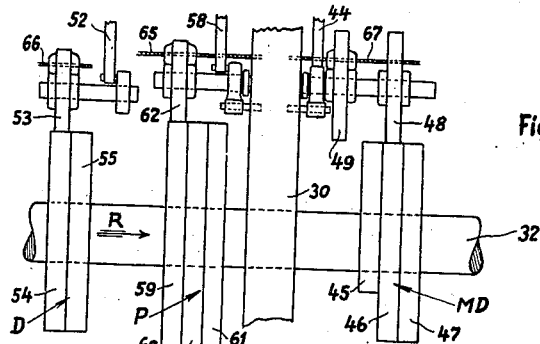
Figs. 19 to 22 are front views of the eccentrics required for operating the covering and closing needles according to the invention and for ordinary covering and pressing in different positions of the cam rolls.

Fig. 19 shows the position of the rolls for ordinary narrowing as required for shaping the leg, calf, heel, and toe of a stocking. In the narrowing position the eccentric shaft 32 is displaced from its normal position in the direction R to the extent of the width of an eccentric. The three sets of eccentrics are designated D, P, MD. The position of the rolls after the lateral displacement of the eccentric shaft 32 is shown in Fig. 19. The roll 48 which transmits the eccentric motion and the up and down motion of the rolls caused thereby to the rod 44 effects up and down motion of the entire narrowing device for the purpose of narrowing. All other eccentrics of the three groups D, P, and MD are inoperative. In group D the roll 53 moves on the eccentric 54 which is so shaped (Fig. 19) that during downward motion of the narrowing device oscillation of the covering needle bar about the shaft 29 is prevented owing to the action of the lever 51 upon the rod 52. The curve in the eccentric 54 is similar to that of the eccentric 46, group MD. In group P the pressing needles 4 are rendered inoperative by the eccentric 59 which has a convex curve for moving the rod 58 upwardly during the narrowing motion, so that the lever 57 transmits to the shaft 37 such an oscillation that the shaft 35 is advanced far enough to prevent any interference on its part with the narrowing operation.

Figure 20:
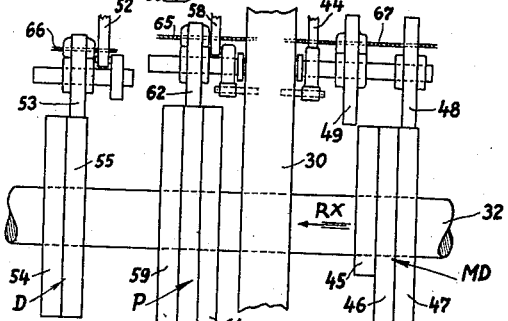

If, according to the invention, the narrowing mechanism is to be used for working in rubber threads by means of covering needles in the manner described and as shown in Figs. 13–17 and 13a–16a, the rolls will be positioned relative to the sets of eccentrics D, P, and MD as shown in Fig. 20. The position shown in Fig. 19 is changed into this position by pushing back the eccentric shaft 32 while in its normal position in the direction RX to the extent of the width of an eccentric, whereby the roll 48 engages the eccentric 47, the roll 62 the eccentric 60, and the roll 53 the eccentric 55. By means of the eccentric 47 the rod 44 and thereby the entire narrowing device is lowered and thus the vertical component of the narrowing motion according to the invention produced. The horizontal component is represented by the concave curve in the eccentric 55, which is slighter than the similar curve in the eccentric 47, so that by the motion of the narrowing device the lever 51 effects a swinging motion of shaft 29, since the rod 52 moves down more slowly than the rod 44 with the narrowing device. Owing to the simultaneous action of the vertical and horizontal components of motion, the motion of the covering needles is produced as contemplated by the invention to attain the operations indicated in Figs. 13–17.

Figure 21:
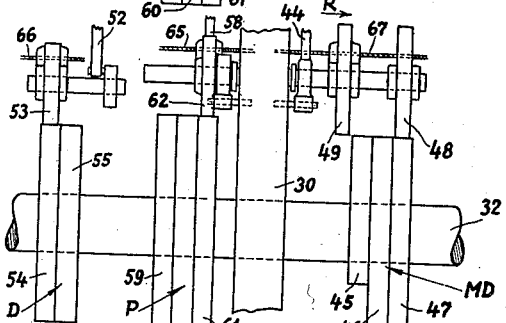

If the wefts are to be laid by means of the pressing needles 4, as shown in Figs. 8–12 and described above, the rolls are brought into the position shown in Fig. 21 relative to the eccentrics D, P, and MD. The eccentric shaft 32 remains in its ordinary position shown in Fig. 20 during this shifting of rolls effected by the wires 65, 66, 67 which draw the rolls to and fro and stagger them relatively to the eccentrics. This operation is known of course. By means of these wires 65, 66, 67 the two rolls 53 and 62 acting on the eccentrics D and P are moved out of their position shown in Fig. 20 and displaced in the direction R to the extent of the width of an eccentric. The rolls 48 and 49 of the set of eccentrics MD have retained their position. Through the medium of the roll 48 and the linkage 44 the entire narrowing device is moved up and down, so that the vertical component of the motion of the pressing needles is attained. The roll 53 of the eccentrics D, which acts on the rod 52, is now disposed on the eccentric 54. The latter has a similar curve as the eccentric 56 of the group MD, which while moving the covering needle bar up and down does not impart to it oscillatory motion, so that the covering needles are eliminated from the operation.

The roll 62 actuating the rod 58 of the pressing needle bar is disposed on the eccentric 61 having a concave curve which is somewhat flatter than the similar curve of the eccentric 47, so that owing to the lagging of the rod 58 which acts upon the lever 57 of the bar 37 oscillation of the lever 57 and thus of the bar 37 is effected, whereby the horizontal component of the motion of the pressing needles is produced as required by the invention in view of Figs. 8 and 12.

Figure 22:
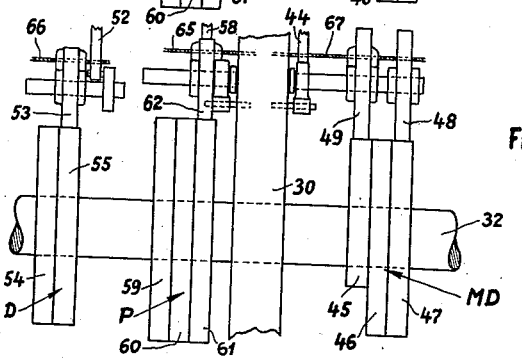

Fig. 22 shows the position of the rolls if pressing and covering needles are to be completely eliminated from the operations involved in laying the weft threads and if no lowering of the narrowing device is required during forming of the courses. For this purpose the roll 53 is placed on the eccentric 55 by means of the wire 66, the roll 62 on the eccentric 61 by the wire 65, the roll 49 on the eccentric 45 while the roll 48 retains its permanent position on the eccentric 47 at regular sinking position of the eccentric shaft. Only the eccentric 45 is actually operative and locks the concave curve in the eccentric 47, so that the rod 44 cannot be lowered and the entire narrowing mechanism remains in its inoperative position shown in Fig. 18.

I claim:

1. A method of working in rubber weft threads in knit fabric which comprises the steps of forming the initial course, placing the weft thread during laying operation thereof under the beards of predetermined repeating groups of bearded frame needles, slipping the weft thread over the beards of the interposed needles between said repeating groups to cause knocking over of the same, retaining the needle loops of the initial course and the hooked portions of the weft thread thereon on the needles until working of the next course, and pressing off and knocking over the loops of the initial course and the hooked portions of the weft thread during formation of the next course thereby tying the hooked portions of the weft thread between the initial and new courses when knit.

2. A method of working a plurality of weft threads into one course comprising the steps of placing the first weft thread under the beards, and of predetermined groups of bearded frame needles and throwing off the weft thread over the hooks of single interposed needles, rearranging the groups of needles before laying of the second weft thread to include the originally interposed needles and to exclude one original needle from each of the said predetermined groups, laying the second weft thread subsequent to rearrangement so that the weft is hooked on the needle over which the first weft was thrown off, and a second rearranging of the needle groups followed by the working in of a third weft thread to produce weft courses only two of which cross each other between needles.

3. A method of working in weft thread in knit fabric comprising the steps of placing portions of weft thread under the beards and of predetermined repeating groups of bearded frame needles and throwing off the weft thread over the interposed needles during downward movement of the needles, tying in the hooked portions of the weft thread between successive courses when knit by pressing off the said portions only during formation of the succeeding course, and the throwing off of the weft occurring over one needle only between the predetermined groups of weft hooking needles.

4. A method of working in a plurality of weft threads in one course comprising the steps of placing the first weft thread under the beards of predetermined bearded needle groups and throwing off the weft over the interposed needles, and thereafter progressively staggering the throwing off of subsequently laid weft threads in respect of the first said thread by successively shifting the position along the needle row of needle groups and interposed needles.

MAX NEBEL.